(12) United States Patent
Papineni (10) Patent No.: US 8,719,285 B2
(45) Date of Patent: May 6, 2014

(54) SYSTEM AND METHOD FOR AUTOMATIC PRESENTATION OF CONTENT-RELATED DATA WITH CONTENT PRESENTATION (75) Inventor: Kishore Papineni, Carmel, NY (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/335,491

(22) Filed: Dec. 22, 2011

(65) Prior Publication Data
US 2013/0166578 A1 Jun. 27, 2013

(51) Int. Cl.
G06F 17/30 (2006.01)
G06F 7/00 (2006.01)

(52) U.S. Cl.
USPC .......................................... 707/755

(58) Field of Classification Search
USPC ............ 707/755, 999.005, 999.102; 715/231, 715/719
See application file for complete search history.

(56) References Cited

U.S. PATENT DOCUMENTS

| | | | | |
|---|---|---|---|---|
| 8,261,182 | B1 * | 9/2012 | Petersen | 715/230 |
| 2002/0138469 | A1 * | 9/2002 | Horovitz et al. | 707/2 |
| 2006/0271524 | A1 * | 11/2006 | Tanne et al. | 707/3 |
| 2007/0294614 | A1 * | 12/2007 | Jacquin et al. | 715/512 |
| 2008/0046812 | A1 * | 2/2008 | Reynar et al. | 715/234 |
| 2008/0059897 | A1 * | 3/2008 | Dilorenzo | 715/764 |
| 2008/0201320 | A1 * | 8/2008 | Hong et al. | 707/5 |
| 2009/0150806 | A1 * | 6/2009 | Evje et al. | 715/762 |
| 2009/0187825 | A1 * | 7/2009 | Sandquist et al. | 715/719 |
| 2009/0254455 | A1 * | 10/2009 | Rothey et al. | 705/27 |
| 2009/0281970 | A1 * | 11/2009 | Mika et al. | 706/12 |
| 2010/0153835 | A1 * | 6/2010 | Xiong et al. | 715/230 |
| 2011/0109632 | A1 * | 5/2011 | Gorev | 345/440 |
| 2012/0023521 | A1 * | 1/2012 | Lordan et al. | 725/35 |

* cited by examiner

Primary Examiner — Robert Beausoliel, Jr.
Assistant Examiner — Nicholas Allen
(74) Attorney, Agent, or Firm — James J. DeCarlo; Greenberg Traurig, LLP (57) ABSTRACT A content item is requested by a user via the user's computing device. In response, data, such as a set of facts, related to the requested content item is identified and served with the requested content item for presentation with the content item at the user's computer device. The related data can comprise facts related to the content item, and the related data can be presented as a graphic, such as part of a multi-dimensional graph, in connection with the presentation of the content. The related data can be retrieved from a facts database using search criteria formed using tags obtained for the requested content item.

21 Claims, 6 Drawing Sheets

SYSTEM AND METHOD FOR AUTOMATIC PRESENTATION OF CONTENT-RELATED DATA WITH CONTENT PRESENTATION

FIELD OF THE DISCLOSURE

The present disclosure relates to presentation of content-related data with presentation of the content, and more particularly to identification of data related to content and presentation of the related data with presentation of the content.

BACKGROUND

More and more, users are using computing devices to access content via one or more computer networks, which usually includes the internet and/or other computing networks. Search engines provide the ability to search for and retrieve the content, and web sites accessed by a user may recommend content to the user. The user typically uses a browser to access the content.

SUMMARY

The present disclosure seeks to address failings in the art and to automatically present data related, or relevant, to content, e.g., content including but not limited to digital content such as text, audio, video, audiovisual, multimedia, streaming, etc. content, presented to the user. Advantageously, the relevance of the data that may be presented in connection with the presentation of the content is determined automatically, such that there is no need for someone to manually or otherwise associate the content and data for the data to be presented in connection content. In accordance with one or more embodiments, the related data comprises facts associated with the content, and the related data is presented generally as a graphic, such as part of a multi-dimensional graph, e.g., a two-dimensional graph, in connection with presentation of the content.

In accordance with one or more embodiments, a method is provided comprising receiving, via at least one server computer, a request for a content item of a plurality of content items; retrieving, via the at least one server computer, the requested content item; obtaining, via the at least one server computer, at least one tag associated with the requested content item; accessing, via at least one computer, a database of facts for use in annotating the plurality of content items, the accessing using the at last one tag associated with the content item to identify a set of facts as being related to the requested content item; and serving, via the at least one server computer, the requested content item and the set of facts in response to the request for the content item, the set of facts to be presented as annotation with the requested content item.

A system, in accordance with one or more embodiments, comprises at least one computing device comprising one or more processors to execute and memory to store instructions to receive a request for a content item of a plurality of content items; retrieve the requested content item; obtain at least one tag associated with the requested content item; access a database of facts for use in annotating the plurality of content items, the access using the at last one tag associated with the content item to identify a set of facts as being related to the requested content item; and serve the requested content item and the set of facts in response to the request for the content item, the set of facts to be presented as annotation with the requested content item.

A computer readable non-transitory storage medium is provided in accordance with one or more embodiments. The computer readable non-transitory storage medium for tangibly storing thereon computer readable instructions that when executed cause at least one processor to receive a request for a content item of a plurality of content items; retrieve the requested content item; obtain at least one tag associated with the requested content item; access a database of facts for use in annotating the plurality of content items, the access using the at last one tag associated with the content item to identify a set of facts as being related to the requested content item; and serve the requested content item and the set of facts in response to the request for the content item, the set of facts to be presented as annotation with the requested content item.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In general, the present disclosure includes a system, method and architecture for automatic presentation of content-related data with content presentation. Certain embodiments of the present disclosure will now be discussed with reference to the aforementioned figures, wherein like reference numerals refer to like components.

Figure 1:
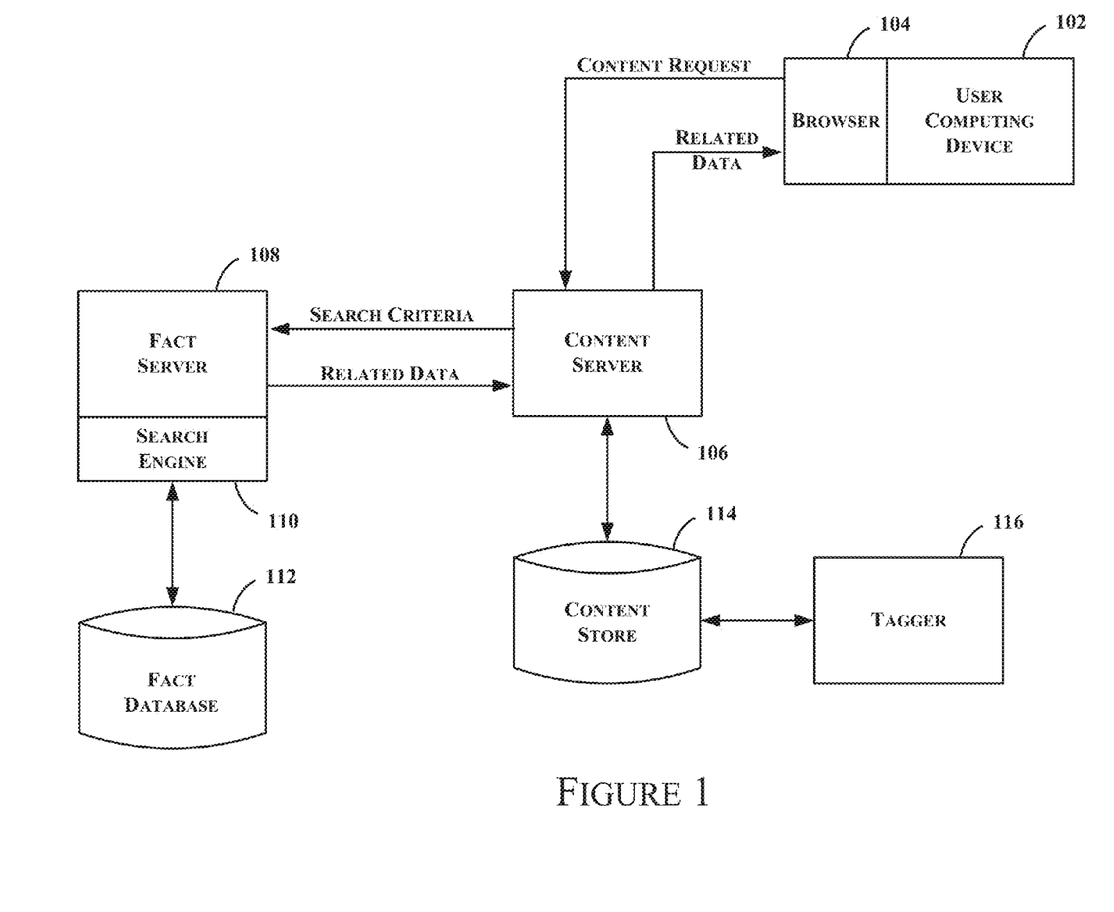
FIG. 1 provides an overview example of a system and architecture for use in accordance with one or more embodiments of the present disclosure.

FIG. 1 provides an overview example of a system and architecture for use in accordance with one or more embodiments of the present disclosure. A request for content is received by content server 106 from a user via a computing device 102. By way of a non-limiting example, the request can be made via a browser application, e.g., browser 104, executing on computing device 102. Content server 106 retrieves the requested content item from content store 114. One or more tags associated with the retrieved content item are retrieved. By way of a non-limiting example, tagger component 116, which can be internal or external to content server 106, extracts the tags from the requested content item.

By way of some further non-limiting examples, the content item can be a news article. When the news article becomes available, such as from a news article server supplied by a feed provider, e.g., Associated Press (AP), Agence France-Press (AFP), Reuters, etc., or by a web crawler, the article content can be analyzed automatically using one or more natural language processing tools such as without limitation a named entity recognizer, which can be used to recognize names of people, places, and organizations, and/or a part-of-speech taggers, which generates output that can be used to identify and/or extract noun phrases. Named entities and noun phrases can be assigned scores based on how many times and in which positions each appears in the news article as well as each one's count in the universe of all previously collected news articles. Top scoring entities and noun phrases can be used as a set of "tags" for the article. The set of tags can be added to the metadata of the news article.

The tags associated with the news article, or other content item, may be rescored prior to or at the time of serving the article to the user's browser 104. By way of some non-limiting examples, the tags may be rescore based on user's browsing history ("profile") to select a subset that is likely to be of interest to the user, such as and without limitation, the user's profile may be used to identify or filter the set of countries mentioned in the article. In so doing, the data presentation can be personalized to the particular user.

Content server 106 forwards the tags that are to be used to search fact database 112 to fact server 108. Fact server 108 can comprise, or be in communication with, a search engine 110. Search engine 110 uses the search criteria, e.g., the tags received from content server 106, to search fact database 112 to retrieve one or more sets of facts. In accordance with one or more embodiments, the data, or facts, retrieved from fact database are forwarded by fact server 108 to content server 106. Content server 106 serves the requested content item and the set of facts, as data related to the requested content item, to the user's computer device 102 and browser 104. The related data, e.g., the facts retrieved from facts database 112 can be presented, via the browser to the user at the time that the requested content item is presented to the user in a page of the browser 104. In accordance with an alternate embodiment, the fact server 108 can serve the fact retrieved from the fact database 112 to the user's computing device 102, and the content item is served by the fact server 108 or the content server 106.

It should be apparent that components, such as the content server 106, tagger 116, fact server 108 and search engine 110 can be implemented by the same server computer or computing device, or may be implemented via two or more different server computers or computing devices.

In accordance with one or more embodiments, search engine 110 queries the fact database 112 and returns results which comprise at least one set of facts comprising data contained in a cell formed by the intersection of a row and column(s) identified in a query using some or all of the search criteria transmitted by the content server 106. By way of one non-limiting example, the search criteria can comprise one or more entities, e.g., entity="United States" and one or more aspects, e.g., aspect="oil". The query operation compares each row's entity designation with entity search criteria to identify the row that has the "United States" entity designation, and compares column description or other column designations of the identified row with the aspect search criteria to identify one or more columns that match the aspect search criteria. The search result comprises the row having an entity name designation of "United States" and all columns that contain "oil" in the column description or other column designation. Examples of columns might include without limitation columns with designations such as "Total oil supply (thousands of barrels per day)" and/or "Olive oil consumption per capita (grams per day)." The search engine 110 may also expand the original aspect(s) in the query in a manner similar to that done by web search engines. For example, "defense" may be expanded to include "military". In accordance with one or more embodiments, search engine 110 runs on a server computer that is the same or different from the server computer that serves the content item to the user's computing device 102.

Figure 2:
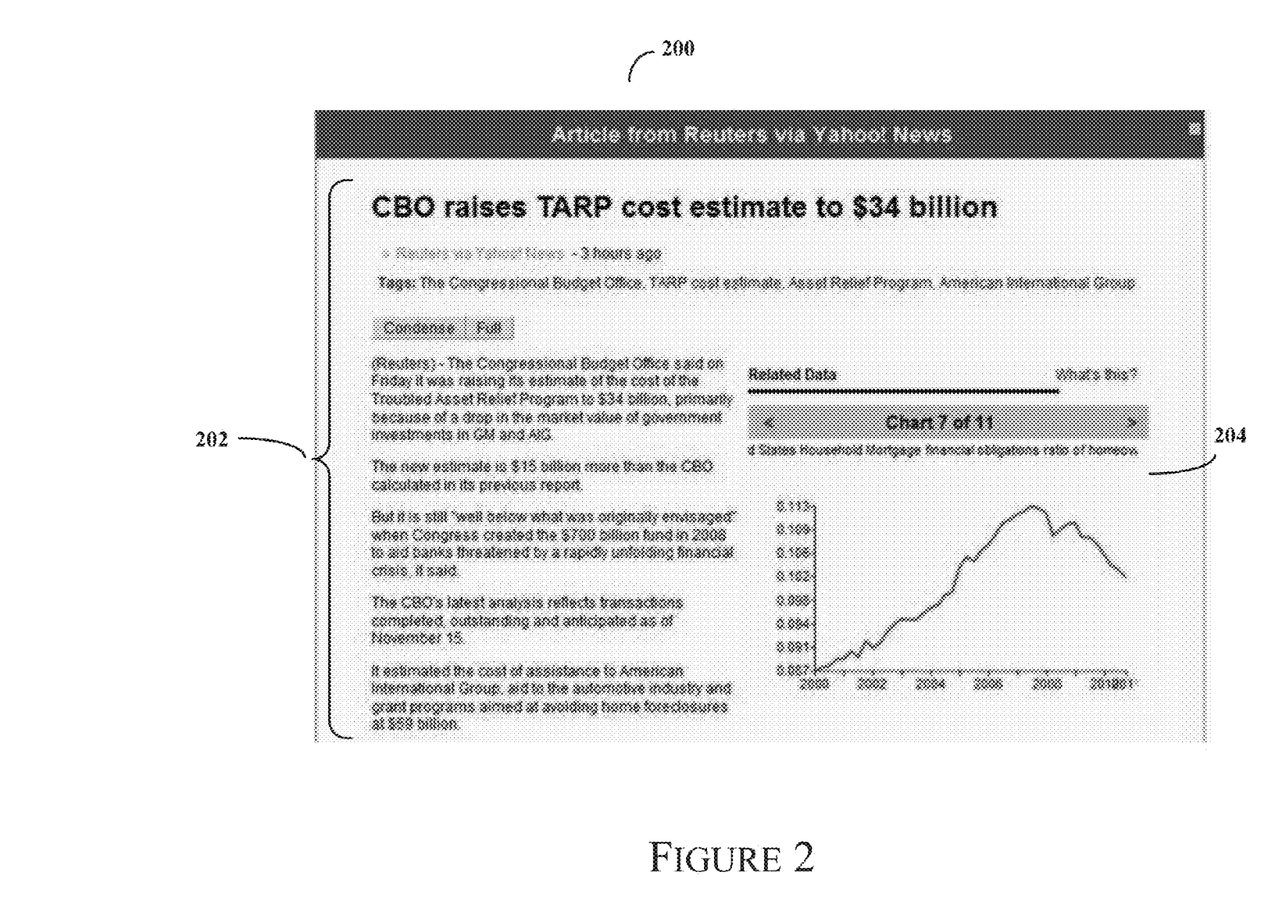
FIGS. 2 and 3 each provide an example of a content item and related data presentation in accordance with one or more embodiments of the present disclosure.
Figure 3:
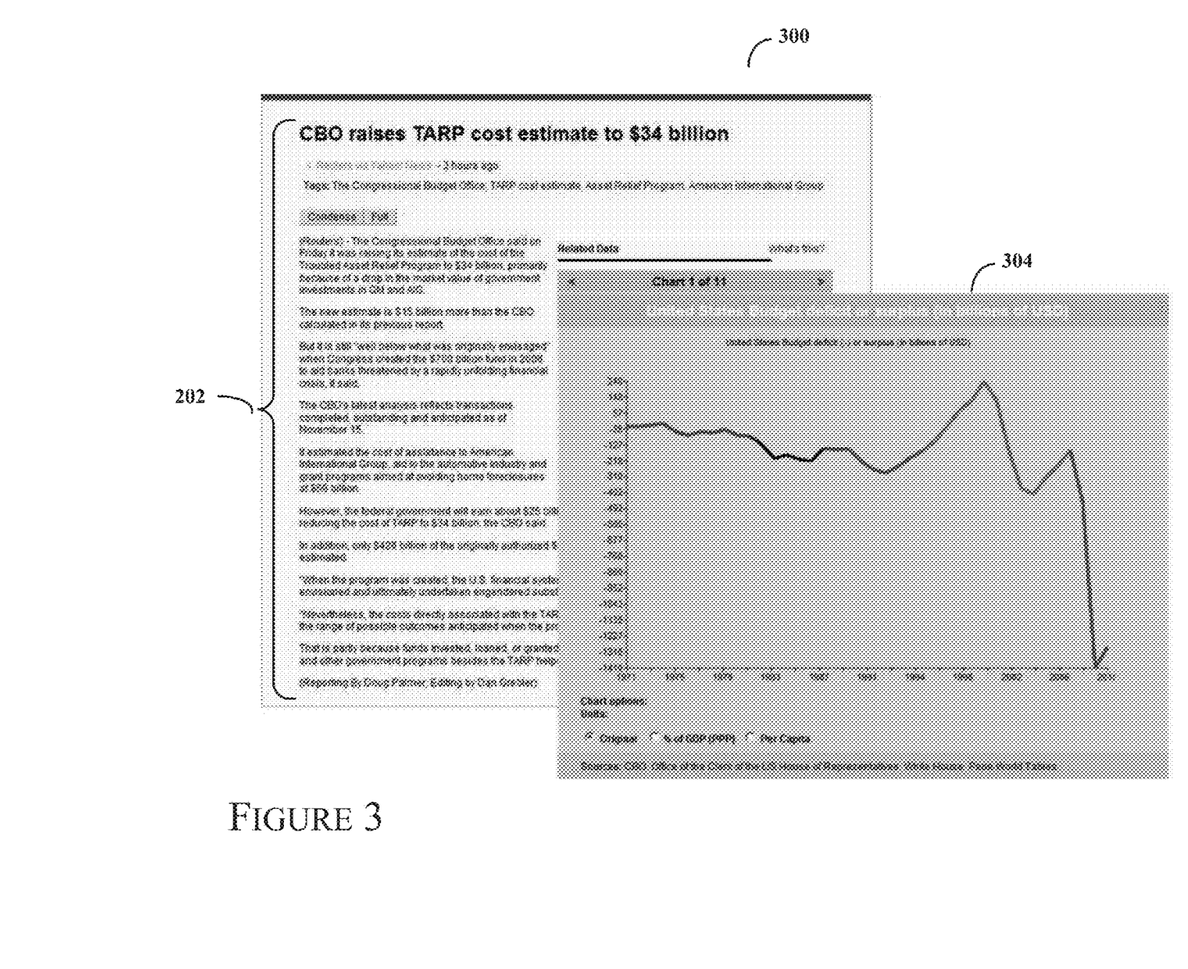

FIGS. 2 and 3 each provide an example of a content item and related data presentation in accordance with one or more embodiments of the present disclosure. With reference to FIG. 2, a presentation 200 by browser 104 comprises an article 202 as the content item. The article discusses the Troubled Asset Relief Program related to home foreclosures and its implied impact on the U.S. budget. The presentation 200 that includes the article 202 also includes related-data presentation 204. In the example provided in FIG. 2, the related-data presentation 204 comprises data determined to be related to the content of article 202. In the example shown in FIG. 2, presentation 204 comprises a chart showing the household mortgage financial obligations ratio of homeowners in the U.S. In the example, the chart is one, which is numbered 7, of eleven charts available for presentation and review by the user. FIG. 3 provides another example of a related-data presentation 300. The example of FIG. 3 illustrates another of the charts, e.g., chart 1 of 11, available as annotation for the article 202. This chart shows the budget deficit with the backdrop of political dominance in Congress color-coded as blue signifying a democratic-dominated Congress, red signifying a republican-dominated Congress and black signifying a split Congress. In addition, this chart also illustrates some examples of user-selectable normalization options, e.g., for the time-series data depicted in the chart. The example further includes data-source citations. The related-data presentation 304 can be provided in response to the user input, e.g., mouse over or click on the chart shown in the presentation area. In the example, the user can scroll left or right through the charts using the scroll arrows "<" and ">" at the top of the presentation area. Each of the charts depict data determined, in accordance with one or more embodiments, to be related to the article 202 using one or more tags associated with article 202 to query fact database 112.

In accordance with one or more embodiments, fact database 112 comprises at least one table, each table having a plurality of rows and each row having a plurality of columns. Each row corresponds to a entity, e.g., a named entity such as without limitation a geographic location, person, organization, etc., and has a plurality of columns, each of which corresponds to an aspect or attribute of the entity, such as without limitation historical population, batting average, market capitalization, etc. In accordance with one or more embodiments, a concept is an abstraction such as without limitation income disparity, social security, public unrest, etc., and a topic is a theme of a content item, such as without limitation a theme of a news article. A content item can have one or more topics.

A cell in fact database 112 corresponds to a specific entity and aspect of the entity. In accordance with one or more embodiments, each cell has a unique identifier, title, associated data, a citation, normalization options, and timeline and chart hints. A cell can comprise a single value, or number, such as 4.06% or may comprise more than one number. By way of a non-limiting example, in a case that the cell contains more than one number, the cell may comprise a series of numbers, e.g., a time series such as without limitation a year, attributes and a value associated with each time attribute, e.g., 1971:3, 1972:2.2, 1973:4.3, etc. By way of another non-limiting example, a cell having multiple values might comprise another type of attribute and value pairs, such as Caucasian: 80, Black: 12.9, Asian: 4.4, etc. The following provides an example of a cell in the fact database 112, in accordance with one or more embodiments:

{"_ent_":"United States", "cbo_budgrev":{"t":"Budget revenue (in billions of USD)", "data":"1971:187.1 1972:207.3 1973:230.8 1974:263.2 1975:279.1 1976:298.1 1977:355.6 1978:399.6 1979:463.3 1980:517.1 1981:599.3 1982:617.8 1983:600.6 1984:666.4 1985:734.0 1986:769.2 1987:854.3 1988:909.2 1989:991.1 1990:1032.0 1991:1055.0 1992:1091.2 1993:1154.3 1994:1258.6 1995: 1351.8 1996:1453.1 1997:1579.2 1998:1721.7 1999:1827.5 2000:2025.2 2001:1991.1 2002:1853.1 2003:1782.3 2004: 1880.1 2005:2153.6 2006:2406.9 2007:2568.0 2008:2524.0 2009:2105.0 2010:2161.7", "cite":"CBO", "chart":"line", "norm":[{"id":"pwt_tcgdp", "t":"% of GDP (PPP)"}, {"id": "pwt_POP", "t":"Per Capita"}], "timeline":["uscongdiv", "potus"]}

In the non-limiting example above, an entity, or "_ent_", which is identified as "United States", has an aspect identified with a unique identifier, "cbo_budgrev". The "cbo_budgrev", or congressional budget office (CBO) budget revenue, has an associated title designated in the cell using "t" of "Budget revenue (in billions of USD)". In the example, the title includes the unit of measure, i.e., in billions of U.S. dollars. The cell in the example also includes a "cite" field, which can be automatically determined based on the source of the data, a "chart" field identifying a chart type, e.g., "line" for time series, "pie" for percentages, "null" for other data types, etc.

Also included in the example are "norm" and "timeline" fields for the aspect, which provide hints for the aspect. The "norm" and "timeline" fields might be used with an aspect that has time-series data, for example. The data, e.g., time-series data, can be provided in absolute values, e.g., absolute dollars. The "norm" hint or field specifies a normalization option identifying other formats or scalings for the data, such as without limitation scaling that is relative to a baseline such as gross domestic product (GDP) or per capita. By way of some non-limiting examples, an absolute dollar amount can be presented as a percentage of GDP or on a per-capita basis. By way of one non-limiting example, normalization options can be specified as a listing including a plurality of macroeconomic variables in a table and offering two normalization options by default (per-capita and %-of-GDP). Timeline hints can be specified in this manner as well. By way of some non-limiting examples, a timeline hint can result in macroeconomic variables being presented with auxiliary information as a backdrop. By way of a further non-limiting example, using the timeline hint, a value, either absolute or scaled, can be presented for a given time period along with information identifying the political party that controlled U.S. congress at the time (as identified from "uscongdiv" data) and/or the sitting president (as identified from "potus" data) at the time.

A hint can provide information about the manner in which the data is to be rendered, e.g., as a chart, such as without limitation as a line chart or as a bar chart. Another non-limiting example of a hint is one that identifies other data that might identify a relationship between the cell data and other data that can used as a comparison with the cell data. By way of one non-limiting example, a hint might indicate that "US historical GDP" is informative comparative data for "US historical military spending in dollars." Based on such a relationship that is associated with the data in the fact database 112, the user can be given a "Show as percent of GDP" option for plotting the chart via the browser client.

Fact database 112 can be created and updated as new or updated data is released by data providers, e.g., data provided by governmental agencies, etc.

In accordance with one or more embodiments, the normalization and timeline hints cause the fact server 108 to retrieve additional cells from the database. To illustrate without limitation, normalization hint data, such as GDP data, identified as "pwt_tcgdp", and/or population data, identified as "pwt_pop", and/or the "uscongdiv", "potus" timeline hints from the "cbo_budgrev" cell can be retrieved by the fact server 108. For example, the fact server retrieves GDP, population, congressional party control, and sitting president information from the entity/row associated with the United States entity. The information retrieved in connection with the normalization and timeline hints can be transmitted to the computing device 102 as part of the related data forwarded with the requested content item.

In accordance with one or more embodiments, the user's computing device 102 can execute a program, e.g., a javascript program, to use a hint with the concomitant data to render the original time series of cbd_budgrev in different scales and/or with different background information in accordance with the normalization and timeline hints. The program executed by the computing device 102 can render the cbd_budgrev data in various forms in response to user input/request, for example.

Figure 4:
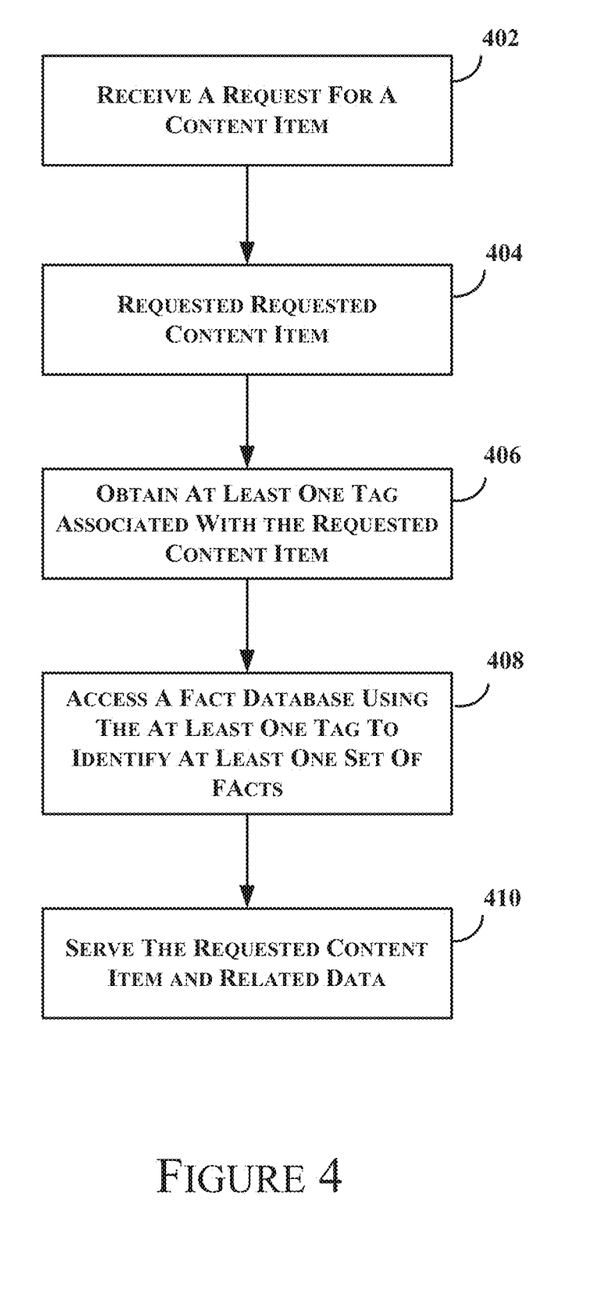
FIG. 4 provides a process flow example for use in accordance with one or more embodiments of the present disclosure.

FIG. 4 provides a related-data presentation process flow example for use in accordance with one or more embodiments of the present disclosure. At step 402, a request is received for a content item. By way of a non-limiting example, the request can be received by content server 106 from user computing device 102. At step 404, the requested content item is retrieved, e.g., retrieved by content server 106 from content store 114. At step 406, at least one tag associated with the requested content item is obtained, e.g., the at least one tag is obtained by tagger 116 from the content item, metadata associated with the content item and/or another source. The obtained tags are used to search a database of facts, e.g., fact database 112, at step 408. By way of a non-limiting example, search engine 110 searches fact database 112 to identify one or more rows corresponding to the one or more entity designations in the search criteria, and to identify one or more columns corresponding to the one or more aspect information from the search criteria. The search results include one or more sets of facts related to the requested content item. At step 410, the one or more set of related facts and the requested content item are served to the user's computing device in response to the request for the content item.

In accordance with one or more embodiments, in addition to the related facts, step 408 can further retrieve one or more hints, e.g., normalization and timeline hints. As discussed herein, the normalization and timeline hints can be transmitted with the related data and used by the browser 104 in determining a manner in which the related data is presented to the user. In accordance with one or more embodiments, in addition to the related facts, step 408 can further retrieve other information such as the title, citation and/or one or more social annotations corresponding to the set of related facts. This information can be transmitted to the user's computing device 102 and presented to the user as part of the related data presentation.

In accordance with one or more embodiments, the browser 104 uses a program, e.g., a JavaScript™ program, to receive the related data and present the related data to the user. In accordance with one or more embodiments, the program that is used by the browser 104 can be downloaded to the user computing device 102 from a site designated by a universal resource locator (URL). By way of a non-limiting example, the URL can point to the content server 106, fact server 108 or another server. Once it is received at the computing device 102, the browser invokes the program. The program can remain loaded as the user does not navigate away to another website's URL, for example. The program might have one or more methods, or functions, one of which has functionality to display the facts received via the fact server 108. The program can further have functionality to make a decision concerning where on the page to display the facts, and how to format them, etc. Some examples of possible placement of the facts on the page include, without limitation, placing the facts (as tables and/or charts) in a separate module (box or sidebar) that is displayed by the browser, displaying a fact close to or in proximity with a mention of the entity or aspect in the content item. For example, poverty figure(s) may be displayed close to the sentence that first mentions poverty in the content item. Another example for placing the facts is displaying a 'fact icon' next to the word 'poverty' in the content item, and clicking or hovering on the icon results in expansion of the icon into a tooltip-like display of the table/chart. As yet another non-limiting example, the word 'poverty' may be highlighted in the content item, and hovering over or clicking on the word results in a tooltip-like display of the table/chart. In the examples shown in FIGS. 2 and 3, the facts are displayed as a separate module.

In accordance with one or more embodiments, a time series can be related with one or more other time series in the fact database 112, such that the time series is served with the one or more other related time series. By way of a non-limiting example, a "US Defense Spending from 1971-2010" time series chart data can be served with "US GDP 1971-2010" time series data and/or "US Population 1971-2010" time series data. This makes it possible to present one time-series as a fraction or percent of another time series. Users can thus select between raw dollars, percent-GDP, or per-capita defense spending, for example. These renderings offer multiple perspectives of the underlying quantity being plotted. By way of a further non-limiting example, a single curve can be rendered in multiple colors, for example to indicate democratic or republican congress/president. For example, historical social security spending, which is a single curve, can be rendered in red for years where Republicans were in majority, blue where Democrats were in majority, and black where there is a split congress. As additional context, a mouse over the curve, or other input such as a click, can reveal the name of the sitting president and his political affiliation.

In accordance with one or more embodiments, a related data presentation can have associated social annotation. While viewing a related data presentation, for example, a user can provide a social annotation, e.g., input that annotates a chart, table or other related data presentation. The user can specify those users that are allowed to view the social annotation, such that where the related data presentation is made to an authorized user, the social annotation is also presented to the authorized user. By way of a non-limiting example, the social annotation can be saved as part of fact database 112, e.g., as a hint field, or in a separate data store. The user authorization information can be saved as part of the fact database 112 or in a separate data store. If the related data is being served to an authorized user, the social annotation can be served with the related data to the authorized user's computing device 102. The social annotation can be presented by the browser when the related data is presented or in response to user input, e.g., a mouse over or click by the user.

RELATED DATA AND GROUP-BY EXAMPLES

Some non-limiting related-data examples are provided below in connection with a content item that is a news article. It should be apparent that the embodiments described herein are not limited to a specific type of content or content item, and that any content type is contemplated. Additionally, it should be apparent that the following examples are illustrative only and are not intended to be exhaustive. Furthermore, the examples use locations as illustrations of entities; however, any type of entity and/or named entity is contemplated.

Example 1

In the example, the content item is an article discussing debt, deficit, revenue, and deficit reduction dealings in the United States. The content server 106 obtains, e.g., extracts from the content item and/or associated metadata the following tags: entities="U.S.", and concepts={debt, deficit, revenue, deficit-reduction deal}. The content server 106 makes a related-data request to the fact server 108, the request includes the identified tags, i.e., the entities and concepts. The fact server 108 directs the search engine 110 to query, and the search engine 110 queries, the fact database 112 using "entity=U.S. & aspects={debt, deficit, revenue, deficit-reduction deal}. As a result the record, or row, corresponding to the entity "U.S." is identified. The identified row contains several fields, or columns. The search engine 110 compares the concepts received from the content server 106 with the aspects corresponding to columns or fields of the identified row, e.g., comparing the concepts to information, such as without limitation the descriptions of the columns and/or the aspects associated with each column in the identified row. As a result, the search identifies the fields "Public Debt", "External Debt", "Household Debt Service Ratio", "Budget Revenue", "Federal Revenue from Corporate Income Taxes" and "Federal Revenue from Individual Income Taxes" from the identified row.

Some of the cells trigger retrieval of side information by way of timeline and normalization hints. By way of a non-limiting example, "Budget Revenue" triggers retrieving data on U.S. population, political divide in the Congress, sitting president of the United States, and historical GDP of the U.S.

In accordance with one or more embodiments, in a case that there are multiple entities and/or aspects, a decision can be made whether or not to group related data by entity and/or aspect. Since there is a single entity in this example, the group-by decision, e.g., group by entity, is trivial, e.g., no grouping is performed. The fact server 108 may format the data if needed, and transmit the retrieved data to the content server, which can forward the retrieved data and content item to computing device 102, or the fact server 106 can transmit the related data directly to the computing device 102. In accordance with one or more embodiments, the data can be in JavaScript™ Object Notation (JSON) format.

At the user computing device 102, the browser 104 can execute a program, e.g., a JavaScript™ program, to render the data on the browser page. By way of some non-limiting examples, the related data might be rendered as a chart, e.g., time-series data, such as historical public debt, might be rendered as a chart, or as a Hypertext Markup Language (HTML) table.

Example 2

In the example, the content item is an article on a European debt deal. The content server 106 obtains, e.g., extracts from the content item and/or associated metadata the following tags: entities="Greece, Italy, Spain, Germany and France", and concepts={debt, default}. The content server 106 makes a related-data request to the fact server 108, the request includes the entities and concepts. The fact server 108 directs the search engine 110 to query, and the search engine 110 queries, the fact database 112 using the entities to identify one or more rows in the fact database 112 and one or more columns for each identified row. The search engine 110 identifies and retrieves five rows corresponding to entities "Greece", "Italy", "Spain", "Germany" and "France", each of which contains several fields (columns). Text-matching is performed on the descriptions of the columns and the aspects resulting in one match on the field "external debt". Since only one aspect is identified, the group-by decision is trivial, e.g., the data can be presented under the heading "External Debt". The fact server 108 may format the data if needed, and transmit the retrieved data to the content server, which can forward the retrieved data and content item to computing device 102, or the fact server 106 can transmit the related data directly to the computing device 102. At the user computing device 102, the browser 104 renders the data on the browser page. By way of a non-limiting example, the related data might be rendered as a bar chart titled "External Debt", showing a comparison of external debt of the above countries.

Example 3

In the example, the content item is an article about Syrian land mines along its border with Lebanon. The content server 106 obtains, e.g., extracts from the content item and/or associated metadata the following tags: "location/entity=Syria, Lebanon, Israel, Turkey, Iran", person="Bashar Assad", concepts={unemployment, poverty, corruption, Lebanese border, Syria mines}. In the example, the news article mentions all the preceding countries. The content server 106 transmits a related-data request to the fact server 108, the request includes the identified tags, i.e., the entities and concepts. The fact server 108 directs the search engine 110 to query, and the search engine 110 queries, the fact database 112 using "entity={Syria, Lebanon, Israel, Turkey, Iran} and aspects={unemployment, poverty, corruption, Lebanese border, Syria mines}. The search engine 110 identifies and retrieves the rows corresponding to entities "Syria", "Lebanon", "Israel", "Turkey" and "Iran",' each of which contains several fields (columns). Text-matching is performed on the descriptions of the columns and the aspects resulting in three matches on the fields "unemployment", "population below poverty line" and "corruption perception index".

Since there are multiple entities and multiple aspects, the fact server 108 can elect to perform a group-by decision. By way of some non-limiting examples, the fact server 108 can group the retrieved data by aspects, such that the unemployment data for each of the five countries is shown under an "unemployment" heading 'unemployment', the population below poverty line data for each of the five countries is shown under a single heading, and the corruption data for each of the five countries is shown under a single heading. In so doing, it is possible to show fewer charts/tables with more entries in each chart or table. Thus, by grouping by aspect three (bar) charts are shown rather than showing one HTML table for each country. If grouping by country, there would be five tables (with the country's name as the heading), listing disparate aspects in each table (corruption perception index is numerically incomparable to unemployment rate). The fact server 108 can use one or more criteria for the group-by decision. By way of one example, the fact server 108 can make a group by decision based on the number of aspects relative to the number of entities, e.g., group by aspect where there are fewer aspects than entities, otherwise group by entity.

The fact server 108 transmits the retrieved data to the content server, which can forward the retrieved data and content item to computing device 102, or the fact server 106 can transmit the related data directly to the computing device 102. At the user computing device 102, the browser 104 renders the data on the browser page. The browser can render three bar charts titled 'Population below poverty line', 'Corruption Perception Index', and 'Unemployment'.

Figure 5:
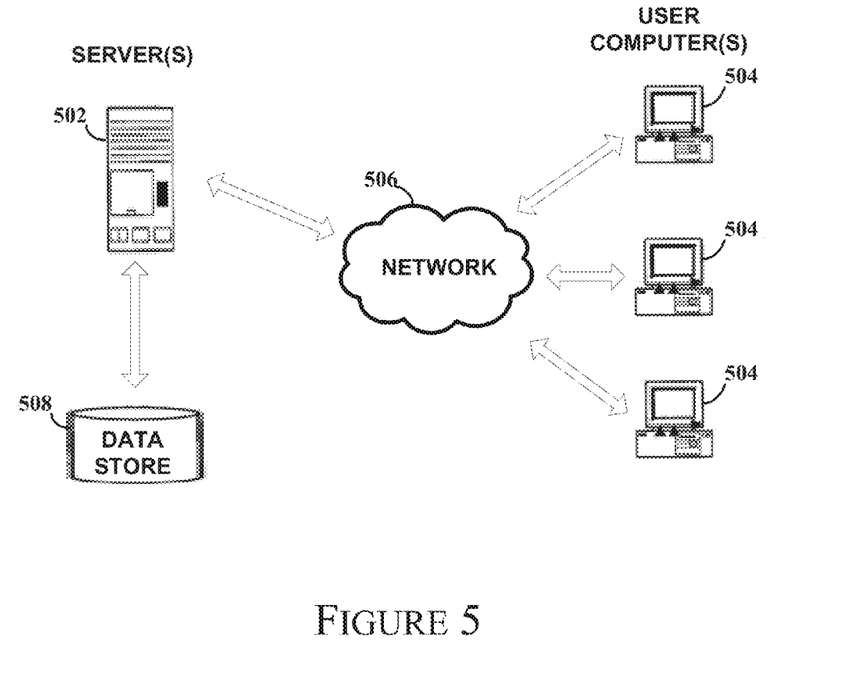
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more servers, user devices 102 or other computing device, are configured to comprise functionality described herein. For example, a computing device 502 can be configured to execute program code, instructions, etc. to provide functionality in accordance with one or more embodiments of the present disclosure. The same or another computing device 502 can be configured to provide the functionality of content server 106, fact server 108, search engine 110 and/or tagger 116. The same or another computing device 502 can be associated with one or more content stores 114 and/or one or more fact databases 112.

Computing device 502 can serve content to user computing devices 504 using a browser application via a network 506. Data store 508 can be used to store program code to configure a server 502 to execute the functionality described herein in connection with one or more embodiments.

The user computing device 504, which can be computing device 102, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 5. Alternatively, embodiments of the present disclosure can be implemented other environments, e.g., a peer-to-peer environment as one non-limiting example.

Figure 6:
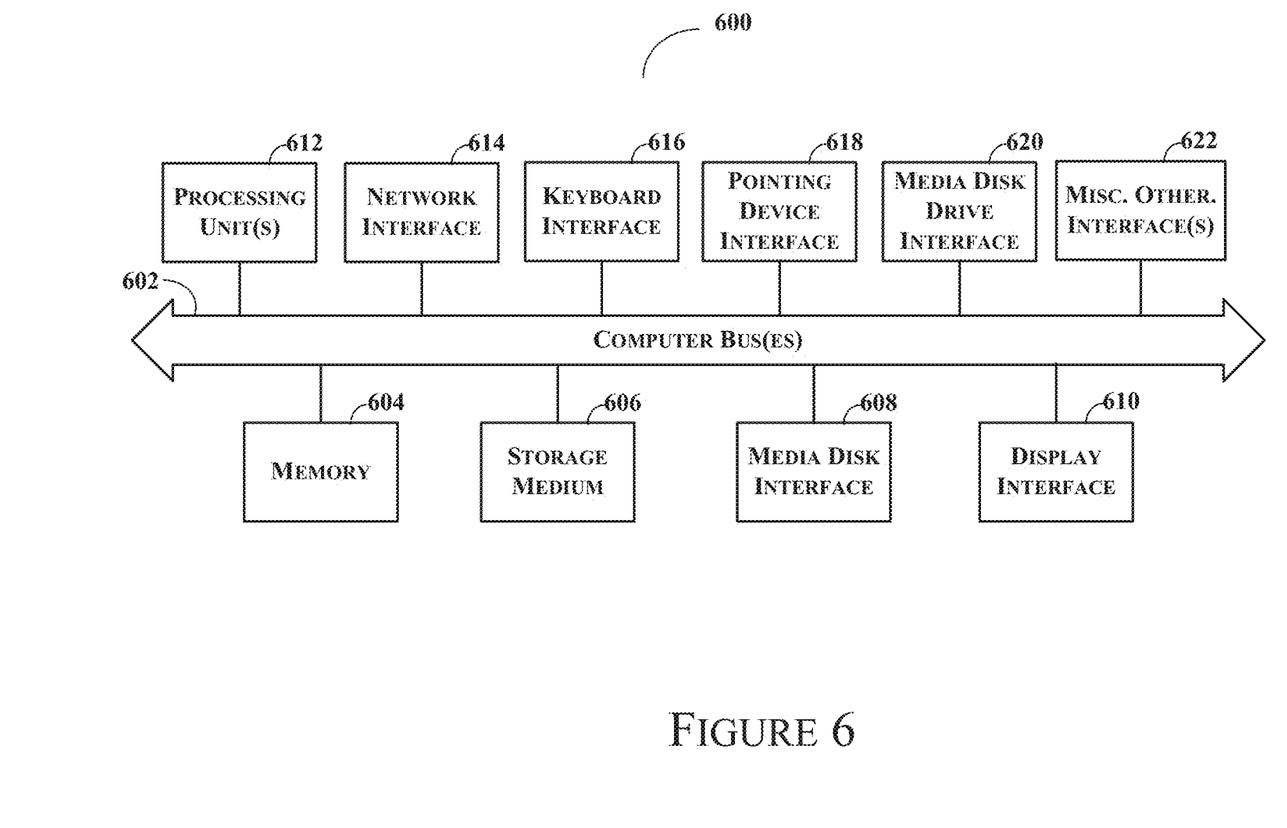
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
receiving, via at least one server computer, a request for a content item of a plurality of content items;
retrieving, via the at least one server computer, the requested content item;
obtaining, via the at least one server computer, at least one tag associated with the requested content item;
in response to the request for the content item, accessing, via at least one computer, a database of facts for use in annotating the plurality of content items, the accessing using the at least one tag associated with the content item to identify a set of facts as being related to the requested content item; and serving, via the at least one server computer, the requested content item and the set of facts in response to the request for the content item, the set of facts to be presented as annotation for the requested content item, wherein the set of facts to be presented as annotation is to be presented in at least one multidimensional chart as annotation for the requested content item.

2. The method of claim 1, wherein the database of facts contains a plurality of rows, each row corresponding to an entity and comprising one or more columns, each column corresponding to an aspect of the entity, the set of the facts stored in the database of facts corresponding to at least one entity and at least one aspect, the at least one tag associated with the requested content item being used to identify the at least one entity and the at least one aspect corresponding to the set of facts.

3. The method of claim 1, the serving further comprising:
serving at least one user social annotation associated with the set of facts, the social annotation to be presented with the set of facts as annotation with the requested content item.

4. The method of claim 1, further comprising:
extracting the at least one tag from the requested content item.

5. The method of claim 1, wherein the database of facts further comprises at least one timeline hint associated with the set of facts, the serving further comprising:
serving the at least one timeline hint with the set of facts.

6. The method of claim 1, the database of facts further comprising group-by information associated with the set of facts, the serving further comprising:
serving the group-by information with the set of facts.

7. The method of claim 1, wherein the set of facts comprise data values and the database of facts further comprises normalization information related to the set of facts to normalize the data values, the serving further comprising:
serving the normalization information with the set of facts.

8. A system comprising:
at least one computing device comprising one or more processors to execute and memory to store instructions to:
receive a request for a content item of a plurality of content items;
retrieve the requested content item;
obtain at least one tag associated with the requested content item;
in response to the request for the content item, access a database of facts for use in annotating the plurality of content items, the access using the at least one tag associated with the content item to identify a set of facts as being related to the requested content item; and
serve the requested content item and the set of facts in response to the request for the content item, the set of facts to be presented as annotation for the requested content item,
wherein the set of facts to be presented as annotation is to be presented in at least one multidimensional chart as annotation for the requested content item.

9. The system of claim 8, wherein the database of facts contains a plurality of rows, each row corresponding to an entity and comprising one or more columns, each column corresponding to an aspect of the entity, the set of the facts stored in the database of facts corresponding to at least one entity and at least one aspect, the at least one tag associated with the requested content being used to identify the at least one entity and the at least one aspect corresponding to the set of facts.

10. The system of claim 8, the instructions to serve further comprising instructions to:
serve at least one user social annotation associated with the set of facts, the social annotation to be presented with the set of facts as annotation with the requested content item.

11. The system of claim 8, the instructions further comprising:
extract the at least one tag from the requested content item.

12. The system of claim 8, wherein the database of facts further comprises at least one timeline hint associated with the set of facts, the instructions to serve further comprising instructions to:
serve the at least one timeline hint with the set of facts.

13. The system of claim 8, the database of fact further comprising group-by information associated with the set of facts, the instructions to serve further comprising instructions to:
serve the group-by information with the set of facts.

14. The system of claim 8, wherein the set of facts comprise data values and the database of facts further comprises normalization information related to the set of facts to normalize the data values, the instructions to serve further comprising instructions to:
serve the normalization information with the set of facts.

15. A computer readable non-transitory storage medium for tangibly storing thereon computer readable instructions that when executed cause at least one processor to:
receive a request for a content item of a plurality of content items;
retrieve the requested content item;
obtain at least one tag associated with the requested content item;
in response to the request for the content item, access a database of facts for use in annotating the plurality of content items, the access using the at least one tag associated with the content item to identify a set of facts as being related to the requested content item; and
serve the requested content item and the set of facts in response to the request for the content item, the set of facts to be presented as annotation for the requested content item,
wherein the set of facts to be presented as annotation is to be presented in at least one multidimensional chart as annotation for the requested content item.

16. The computer readable non-transitory storage medium of claim 15, wherein the database of facts contains a plurality of rows, each row corresponding to an entity and comprising one or more columns, each column corresponding to an aspect of the entity, the set of the facts stored in the database of facts corresponding to at least one entity and at least one aspect, the at least one tag associated with the requested content being used to identify the at least one entity and the at least one aspect corresponding to the set of facts.

17. The computer readable non-transitory storage medium of claim 15, the computer readable instructions that when executed cause at least one processor to serve further comprising computer readable instructions that when executed cause at least one processor to:
serve at least one user social annotation associated with the set of facts, the social annotation to be presented with the set of facts as annotation with the requested content item.

18. The computer readable non-transitory storage medium of claim 15, the computer readable instructions further comprising computer readable instructions that when executed cause at least one processor to:
   extract the at least one tag from the requested content item.

19. The computer readable non-transitory storage medium of claim 15, wherein the database of facts further comprises at least one timeline hint associated with the set of facts, the computer readable instructions that when executed cause at least one processor to serve further comprising computer readable instructions that when executed cause at least one processor to:
   serve the at least one timeline hint with the set of facts.

20. The computer readable non-transitory storage medium of claim 15, the database of facts further comprising group-by information associated with the set of facts, the computer readable instructions that when executed cause at least one processor to serve further comprising computer readable instructions that when executed cause at least one processor to:
   serve the group-by information with the set of facts.

21. The computer readable non-transitory storage medium of claim 15, wherein the set of facts comprise data values and the database of facts further comprises normalization information related to the set of facts to normalize the data values, the computer readable instructions that when executed cause at least one processor to serve further comprising computer readable instructions that when executed cause at least one processor to:
   serve the normalization information with the set of facts.

* * * * *